US006923078B2

(12) United States Patent
Loud

(10) Patent No.: US 6,923,078 B2
(45) Date of Patent: Aug. 2, 2005

(54) PRESTRETCHED SHAFET FOR EDDY CURRENT PROBE

(75) Inventor: Christopher R. Loud, North Bend, WA (US)

(73) Assignee: Zetec, Inc., Issaquah, WA (US)

( * ) Notice: Subject to any disclaimer, the term of this patent is extended or adjusted under 35 U.S.C. 154(b) by 273 days.

(21) Appl. No.: 10/321,101

(22) Filed: Dec. 17, 2002

(65) Prior Publication Data

US 2004/0112154 A1 Jun. 17, 2004

(51) Int. Cl.$^7$ .............................................. G01N 27/00
(52) U.S. Cl. ..................................................... 73/865.8
(58) Field of Search ............................... 73/623, 865.8, 73/866.5; 324/219, 220, 221, 228, 232, 233, 234, 239, 240; 29/594, 595

(56) References Cited

U.S. PATENT DOCUMENTS 4,942,545 A * 7/1990 Sapia ........................... 702/97
5,279,168 A * 1/1994 Timm ......................... 73/866.5
6,339,327 B1 * 1/2002 Potiquet et al. ............. 324/220

FOREIGN PATENT DOCUMENTS

EP        0392295      * 10/1990     ................. 324/220

* cited by examiner

Primary Examiner—Robert Raevis
(74) Attorney, Agent, or Firm—David L. Tingey

(57) ABSTRACT

In an eddy current probe shaft, a sleeve encloses an inner core of length shorter than the sleeve causing the inner core to curl within sleeve. The inner core includes data cables that typically comprise coaxial cables to which the sleeve is attached at shaft lead and trail ends. The shaft is assembled by stretching the sleeve over the inner core and securing the stretched sleeve to the inner core, the sleeve causing the inner core to curl as the sleeve returns to its unstretched length. Slack thus produced in the inner core, and particularly in the coaxial cables, allows the probe to bend without stressing the coaxial cables and without two coaxial cables within the sleeve moving relative to each other therein eliminating signal drift phenomenon caused by a change in capacitance characteristics of the coaxial cables when insulation of the coaxial cables stretch upon bending.

11 Claims, 5 Drawing Sheets

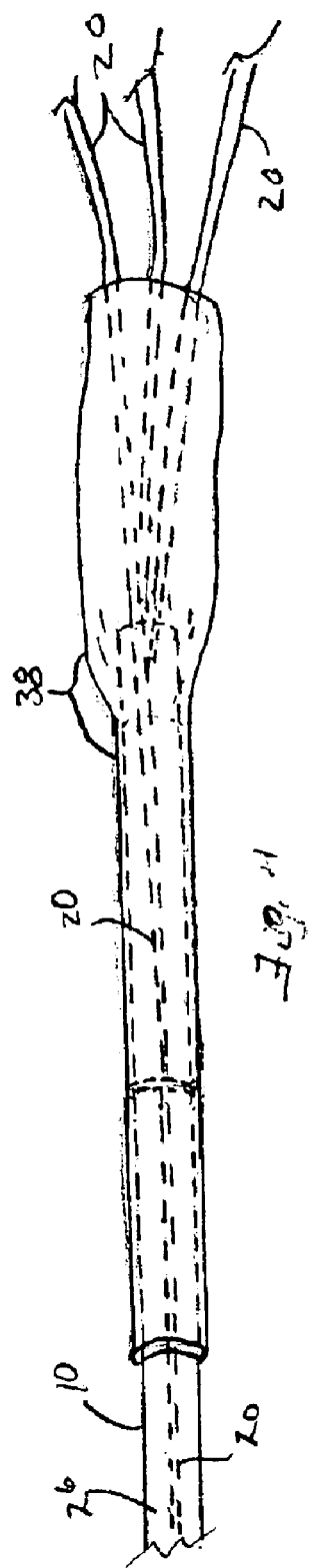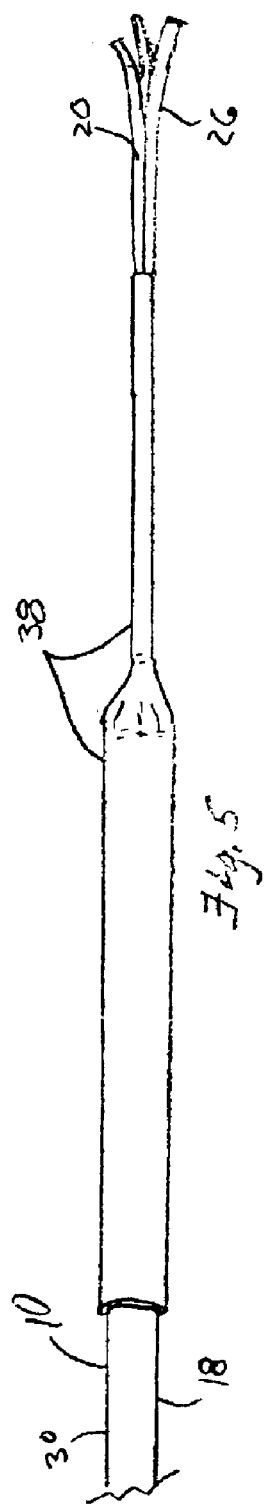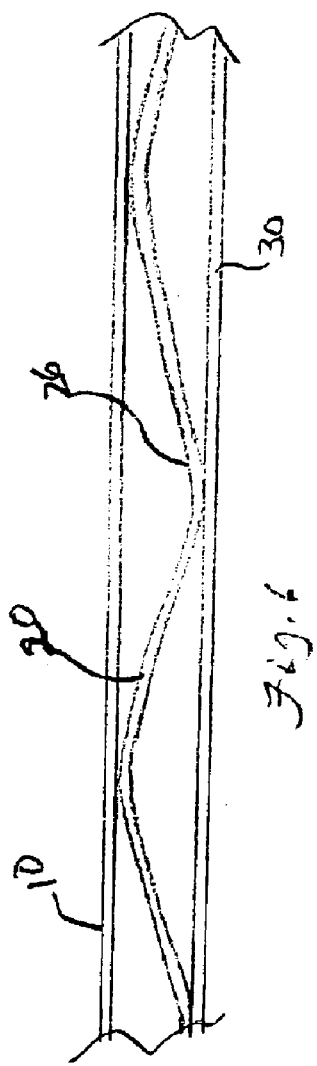

PRESTRETCHED SHAFT FOR EDDY CURRENT PROBE

BACKGROUND

1. Field of the Invention

This invention relates to shafts for eddy current probes and, specifically, to a shaft with a prestretched sleeve over an unstretched inner core.

2. Prior Art

It is known to have an eddy current probe for remotely obtaining nondestructive measurements of the integrity of tubes in nuclear steam generators and heat exchangers. The eddy current probe is pushed through a tube or pipe by a flexible shaft to which it is attached on the shaft lead end, the shaft extending from the probe to a data recorder with data cables running along the shaft. As the shaft impels the probe into the pipe, the probe measures the pipe along the pipe length, transmitting probe measurement data through cables along the shaft.

Because the nuclear industry heat exchanger pipes have a tight bend radius, typically less than 2 inches, the probe and shaft must negotiate around such tight bends. Without the capability of negotiating tight-radii bends, it becomes impossible to perform a full examination of the pipes from one pipe end to another, requiring multiple passes through the pipe from different pipe access locations. Completing a full pipe measurement then results in increased inspection time, increased exposure to personnel setting up the measurement equipment, and increased damage to measurement equipment.

Flexible shafts typically have a structure that allows them to bend within a curved pipe and provide for data cables running with the shaft. Such probe shafts accommodate such tight bends mechanically, however, electrical problems remain.

Historically, there has been an inherent problem associated with bobbin type probes commonly referred to as signal drift. Signal drift manifests itself as a meandering back and froth of the eddy current signal from the null or balance point. In addition to making data analysis very difficult, the signal produced could mimic some types of anomalies in the tubing being tested such as dents, bulges, diameter changes, or changes in the wall thickness of the tubing.

The cause of this phenomenon has long been known and attributed to changes in the condition of the coaxial cables. The motion of bending the cables when driving the probe on and off the probe driver take-up reel (drum) as well as over and back around U-bends in the tubing being tested causes such changes. Bending applies stress to the probe shaft and coaxial cables. Stressing the coaxial cables causes changes in the thickness of the dielectric material that insulates the outer shield of the coax from the center conductor of the cables. This results in changes in the capacitive properties of the coax. Change in these properties effects change to the test instrument null or balance point which causes the signal to drift. A similar effect can be noticed by simply moving the strands of cables in proximity to each other.

It is the primary object of this invention to eliminate capacitance variation in eddy current shafts by eliminating changes in cable insulative properties caused by cable stress from bending.

SUMMARY OF THE INVENTION

This object is achieved in a flexible shaft with a sleeve that encloses an inner shaft structure. The bendable sleeve is made of a lubric material, such as nylon, to facilitate sliding in a pipe and is generally thin-walled to facilitate bending. In combination with the sleeve, the inner structure includes data cables that typically comprise coaxial cables[1].

[1]Coaxial is meant to comprise an inner conductor covered by an electromagnetic shield with an insulator between them and an outer insulator sleeve around the shield.

A probe on a flexible shaft is clamped in a holding mechanism at both a shaft lead end and at a shaft trail end. The shaft comprises an inner core typically including two or more coaxial cables side-by-side covered with the sleeve. In assembly, the sleeve of the shaft is grasped at an unstretched position and stretched a predetermined distance from one end, typically the trail end, by an appropriate stretching mechanism, which clearly may be pneumatic, hydraulic or mechanical without a difference. While the sleeve is stretched, a layer of heat shrink tubing is applied at the stretched end of the shaft over the stretched sleeve and the coaxial cables where the coaxial cables exit the sleeve, holding them securely together. The stretching mechanism then returns the stretchable sleeve to its unstretched position. As the stretched sleeve reduces in length to its unstretched length, the coaxial cables within are forced back into the sleeve causing the coaxial cable in length greater than the unstretched sleeve length to curl inside the sleeve, providing slack in the coaxial cables[2]. This slack allows the probe to bend without stressing the coaxial cables and without two coaxial cables within the sleeve moving relative to each other. This has been found to eliminate the signal drift phenomenon.

[2]The term "curling" is meant to include bunching, gathering, collecting, coiling, spiraling, compressing and any other form of coming together within the sleeve.

BRIEF DESCRIPTION OF THE DRAWINGS

FIG. 4 is a side perspective view of the flexible shaft with shrink wrap tubing around an end of the shaft with the shrink wrap tubing extending beyond the shaft unshrunk. A support tube is shown secured abutted to the end of the shaft by the shrink wrap shrunk around both the end of the tube and the support tube. Coaxial cable, as comprising the shaft inner core, are shown passing through the shaft and tube and emerging from the shrink wrap at its unshrunk portion.

FIG. 5 is a perspective view of the shaft and shrink wrap of FIG. 4 shown with the previously unshrunk shrink wrap portion now shrunk around the coaxial cable, therein securing the shaft to the cable.

FIG. 6 is a cutaway view of the shaft showing the shaft inner core curled within the shaft sleeve.

DETAILED DESCRIPTION OF THE PREFERRED EMBODIMENT

Figure 1:
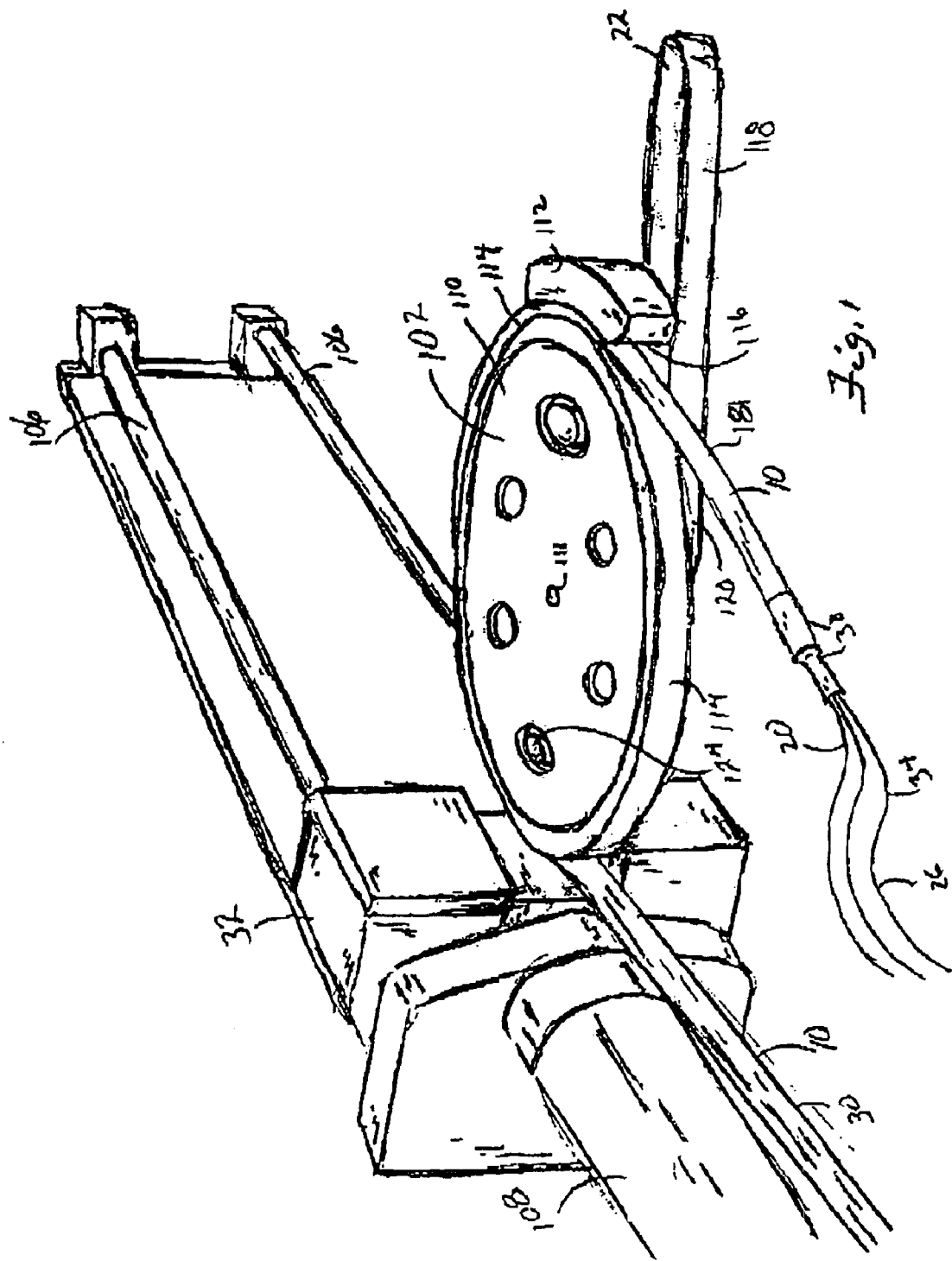
FIG. 1 is a perspective view of the flexible shaft shown mounted to a second holding device at a first holding position at the shaft trail end. The second holding device is shown as a wheel around which the shaft is looped and secured by a brake.
Figure 2:
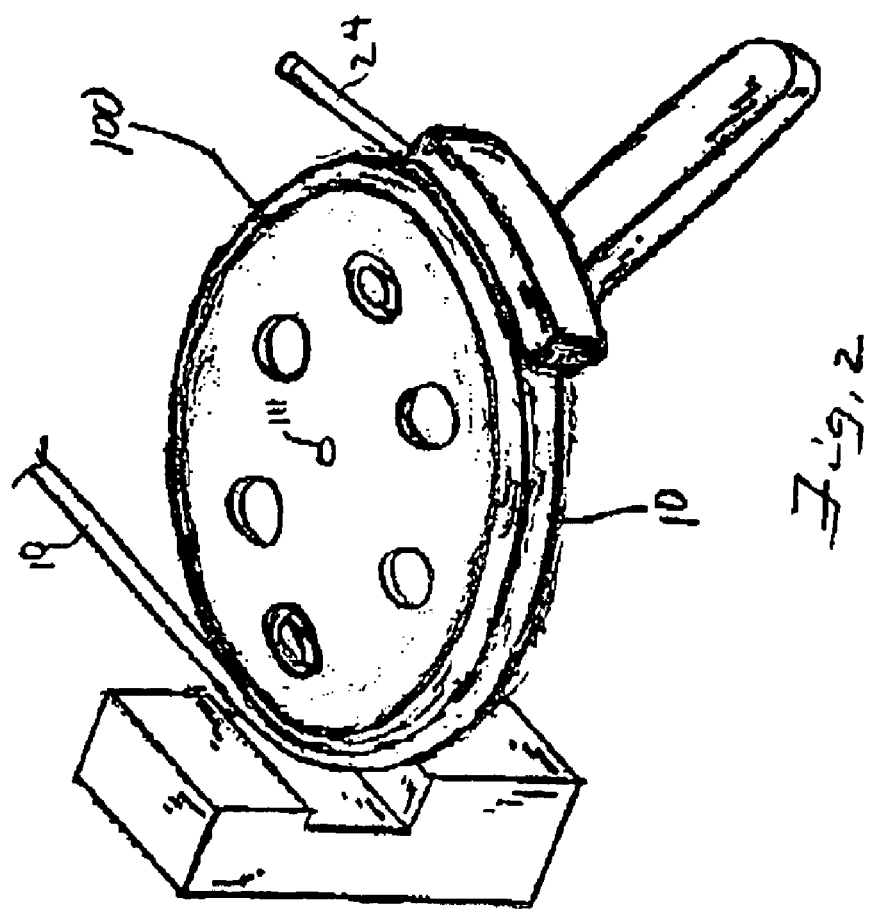
FIG. 2 is a perspective view of the flexible shaft shown mounted to a first holding device at the lead end. The first holding device is also shown as a wheel and brake identical with the second holding device.
Figure 3:
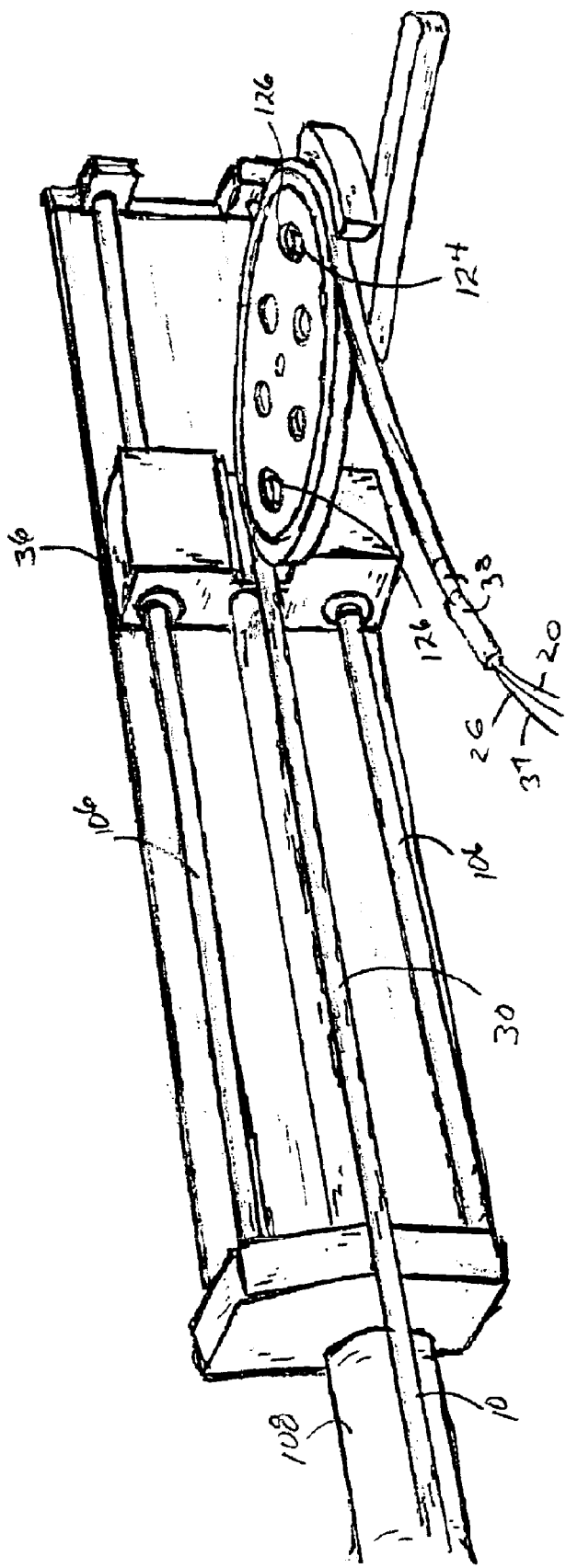
FIG. 3 is a perspective view of the flexible shaft shown mounted to a second holding device at a second holding position at the shaft trail end, the shaft stretched between the first and second holding positions by action of a pneumatic cylinder.
Figure 7:
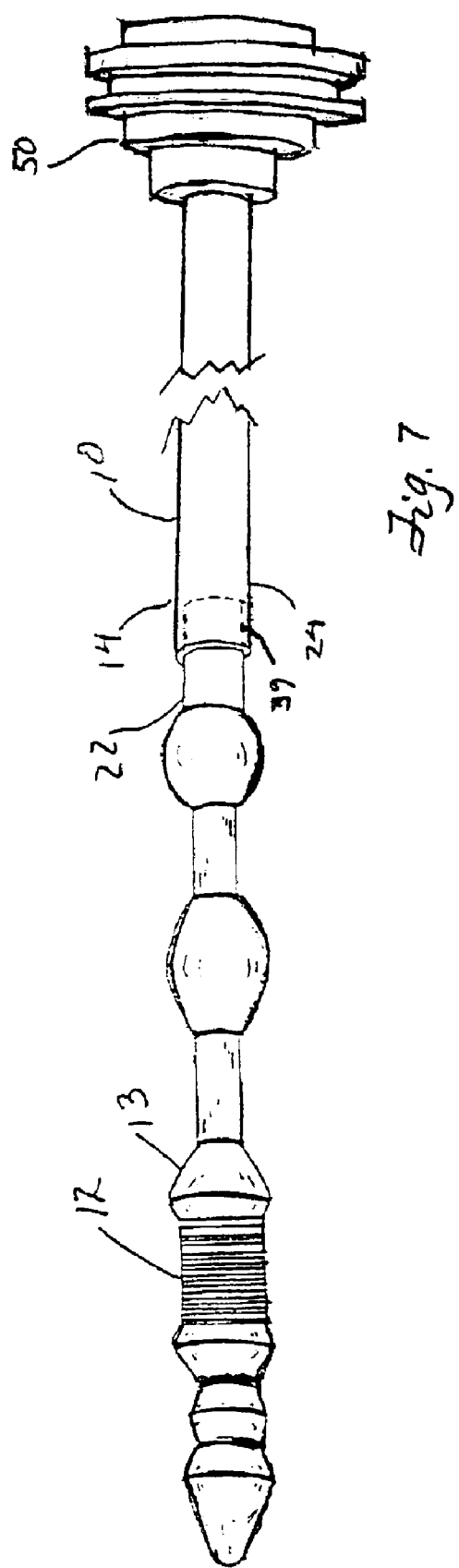
FIG. 7 is a perspective view of an eddy current probe and probe head paraphernalia attached to the lead end of the flexible shaft.

A flexible shaft 10 for an eddy current probe 12 that is useful for overcoming eddy current probe signal drift, or at least that drift due to capacitance changes in data cable within caused by cable bending, is assembled with a probe head 13 on a shaft lead end 14. Probe paraphernalia 22 closes a shaft lead end 24, also with coaxial cable 20 passing to the probe head 13. The probe shaft 10 comprises an inner core 26 including at least one coaxial cable 20, and typically two or more coaxial cable side by side running between the shaft lead end 24 and the shaft trail end 18, and a resilient and stretchable sleeve 30 around the inner core 26 to enclose or cover it continuously between the lead and trail ends secured to the coaxial cable 20 at the lead and trail ends 24 and 18 with the sleeve 30 of length shorter than the inner core 26 such that the inner core 26 is slightly curled within the sleeve 30.

The probe shaft 10 is assembled by first securing the shaft 10 to first and second holding devices 100 and 102. First and second holding devices 100 and 102 are typically identical, or mirror images of each other, comprising a wheel 110 rotatable on its axis 111 and a brake 112. A ring 114 of soft material, such as rubber or the like, encloses the wheel circumference. The brake having an inner contour 116 matching the ring 114 is mounted on a brake arm 118. A brake arm proximal end 120 is mounted rotationally and eccentrically relative to a wheel rotational axis such that when the brake arm is moved the brake moves toward or away from the ring 114. Thus, when a probe shaft 10 is wrapped around the ring 114 between the ring and the brake inner contour 116, the shaft is locked in place on the ring as the brake arm distal end 122 is moved away from the shaft trail end 18. Once the brake engages the shaft against the ring, movement of the wheel 110 from the first holding position 32 to the second holding position 36 tends to rotate the wheel 110 and brake 112 into an ever tighter engagement of the shaft between the brake 112 and the ring 114 as the brake is pulled closer to the ring, preventing the shaft from sliding on the ring 114. To further prevent sliding of the shaft 10 on the ring 114, the wheel can be locked in nonrotatable position. To enable the braking action described above before the wheel is locked, the wheel can be allowed to rotate slightly before coming into its lock position. For example, a stationary wheel post 124 smaller than an eccentric wheel hole 126 extends into the wheel hole. The wheel 110 is thus allowed to rotate only until it engages the wheel post 124.

With the shaft 10 at its lead end 24 firmly attached to first holding device 100, the shaft 10 at its trail end 18 is secured by the second holding device 102 at a first holding position 32 between the shaft lead end 24 and the shaft trail end 18. In this unstretched condition, the inner core 26 rests within the unstretched sleeve 30 and extending substantially out of the sleeve 30 at the sleeve trail end 18 defining a first inner core position 34. The sleeve 30, of length shorter than the inner core 26, is then stretched near the shaft trail end 18 from the first holding position 32 to a second holding position 36 also between the shaft lead end 24 and the shaft trail end 18. The inner core 26 is then drawn substantially into the sleeve 30 to a second inner core position 37, shown slightly emerging from the sleeve 30 instead of emerging substantially as in its first inner position 34.

The sleeve 30 is stretched by a suitable stretching mechanism 108, shown as a hydraulic cylinder, moving the mounting device 102 from its first and second holding positions 32 and 36 on a pair of rods 106.

The sleeve 30 in its stretched position at second holding position 36 with the inner core 26 drawn inside is then secured to the inner core 26, comprising at least one coaxial cable 20. Typically, the sleeve 30 and coaxial cable 20 are secured together with heat shrink tubing 38 shrunk around the stretched sleeve 30 and the coaxial cable 20 at the shaft trail end 18.

The stretching mechanism 108 then translates the shaft from its second holding position 36 back toward the shaft lead end to the first holding position 32 therein allowing the stretched sleeve 30 to return to its unstretched condition and causing the inner core 26 comprising the coaxial cable 20 to curl inside the sleeve 30. Thus in operation with the coaxial cable 20 curled within the sleeve 30 the coaxial cable 20 partially uncurls without stressing as the shaft 10 bends around turns in a pipe.

The probe head 13 may be secured to the coaxial cable 20 and sleeve 30 on the cable lead end 24 before or after stretching. Typically, the probe head 12 is threaded into matching inner threads 39 at the shaft lead end 24 and secured closed by shrink wrap tubing around the joint of the probe with the tube lead end 24. An electrical connector 50 may be mounted to the sleeve 30 and electrically connected to the coaxial cable or cables 20 at the sleeve trail end 18.

Clearly, it is equivalent to initially secure the sleeve 30 at the trail end 24 and stretch the cable 30 at the lead end instead of stretching at the trail end as described above for convenience in description. This and other obvious extensions and applications of the art disclosed are included in the present disclosure and deemed a part of the invention.

Having described the invention, what is claimed is:

1. A flexible shaft for moving an eddy current probe on a shaft lead end through a pipe, the improvement in the shaft comprising,
   a flexible inner core running between a shaft lead end and a shaft trail end,
   a flexible and resilient sleeve around the inner core stretchable longitudinally between a first, or unstretched, condition and a second, or stretched, condition. the sleeve secured to the inner core at shaft lead and trail ends THE FLEXIBLE INNER CORE CURLED WITHIN THE SLEEVE IN SLEEVE UNSTRETCHED CONDITION AND AT LEAST PARTIALLY UNCURLING AND CURLING AS THE SLEEVE MOVES LONGITUDINALLY BETWEEN STRETCHED AND UNSTRETCHED CONDITIONS.

2. The flexible shaft of claim 1 in which the shaft is stretchable without stretching the inner core, the inner core uncurling as the shaft stretches.

3. The flexible shaft of claim 1 in which the shaft is bendable as it tracks a bend in the pipe, the sleeve stretching around the bend, the inner core within uncurling without stretching.

4. The flexible shaft of claim 1 in which the inner core comprises an insulated electrically-conducting cable.

5. A flexible shaft for moving an eddy current probe on a shaft lead end through a pipe, the improvement comprising,
   at least one insulated electrically-conducting coaxial cable running between a shaft lead end and a shaft trail end,
   a flexible and resilient sleeve around the at least one coaxial cable stretchable between a first, or unstretched, condition and a second, or stretched, condition, the sleeve secured to the at least one coaxial cable at shaft lead and trail ends THE FLEXIBLE INNER CORE CURLED WITHIN THE SLEEVE IN SLEEVE UNSTRETCHED CONDITION AND AT LEAST PARTIALLY UNCURLING AND CURLING AS THE SLEEVE MOVES LONGITUDINALLY BETWEEN STRETCHED AND UNSTRETCHED CONDITIONS, the shaft being stretchable without stretching the at least one coaxial cable, an eddy current probe mounted to the sleeve and electrically connected to the at least one coaxial cable at the sleeve lead end, an electrical connector mounted to the sleeve and electrically connected to the at least one coaxial cable at the sleeve trail end.

6. The method of assembling a flexible shaft for an eddy current probe, the shaft having lead and trail ends, the probe shaft comprising an inner core and a resilient sleeve around the inner core, comprising the following steps:

(1) Securing the sleeve to the inner core at the shaft lead end;

(2) Immobilizing the shaft at its lead end;

(3) Securing the sleeve near its trail end at a first balding position with the inner core extending substantially from the sleeve at its trail end;

(4) Stretching the sleeve near its trail end from the first holding position to a second holding position between the shaft trail and lead ends generally, therein drawing the inner core substantially into the sleeve;

(5) Securing the sleeve near the trail end to the inner core with the sleeve at the second holding position near the trail end;

(6) Moving the shaft near its trail end from said second holding position to said first holding position therein causing the coaxial cable to curl within the sleeve.

7. The method of claim 6 wherein step (5) further comprises the following steps:

(a) applying tubing around the sleeve and the inner core at the trail end;

(b) shrinking the tubing tightly to the sleeve and to the inner core to secure them together.

8. The method of claim 6 further including the step of securing an eddy current probe to the shaft at the shaft lead end.

9. The method of claim 6 wherein the inner core comprises at least one electrically-conducting insulated cable.

10. The method of assembling a flexible shaft for an eddy current probe, the shaft having lead and trail ends, the probe shaft comprising at least one electrically-conducting insulated cable and a resilient sleeve around the cable, comprising the following steps:

(1) Securing the sleeve to the at least one electrically-conducting insulated cable at the shaft lead end;

(2) Securing the shaft to said eddy current probe;

(3) Immobilizing the shaft at its lead end;

(4) Securing the sleeve near its trail end at a first holding position with the at least one electrically-conducting insulated cable extending substantially from the sleeve at its trail end;

(5) Stretching the sleeve near its trail end from the first holding position to a second holding position between the shaft trail and lead ends generally, therein drawing the at least one electrically-conducting insulated cable substantially into the sleeve;

(6) Securing the sleeve near the trail end to the at least one electrically-conducting insulated cable with the sleeve at the second holding position near the trail end;

(7) Applying tubing around the sleeve and the at least one electrically-conducting insulated cable at the trail end;

(8) Shrinking the tubing tightly to the sleeve and the at least one electrically-conducting insulated cable to secure them together;

(9) Moving the shaft near its trail end from said second holding position to said first holding position therein causing the at least one electrically-conducting insulated cable to curl within the sleeve.

11. The method of claim 10 wherein the at least one electrically-conducting insulated cable comprises coaxial cable including an axial conductor and an electromagnetic shield around the conductor and an insulator between them.

* * * * *